No. 882,768. PATENTED MAR. 24, 1908.
A. T. McILWAIN.
SIDING ATTACHMENT FOR PLOWS.
APPLICATION FILED NOV. 1, 1907.
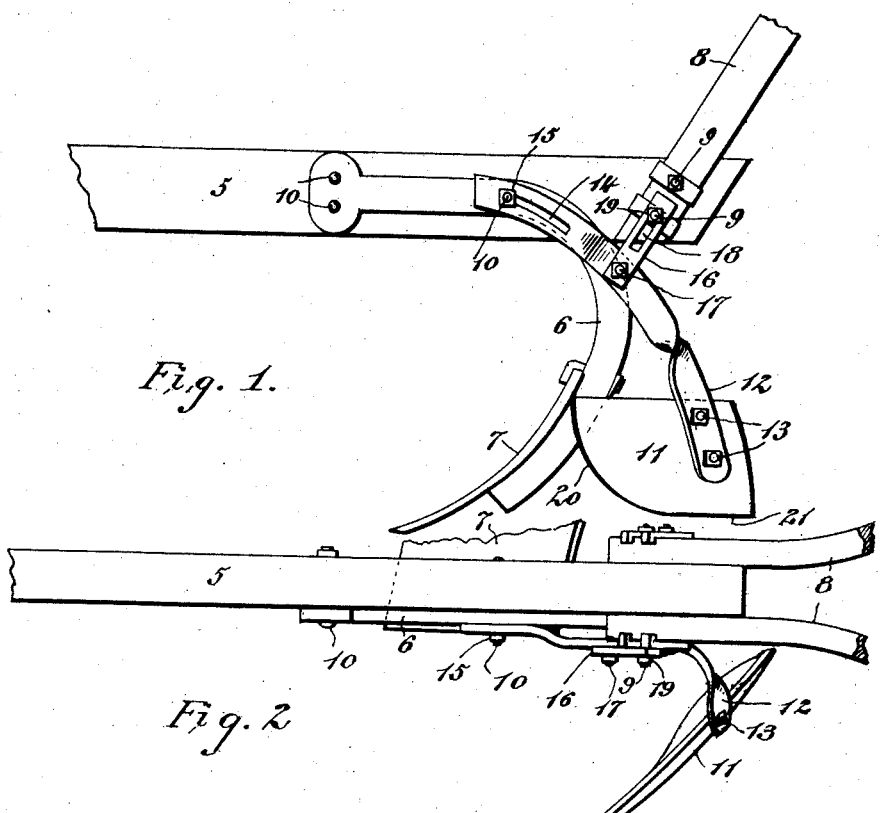
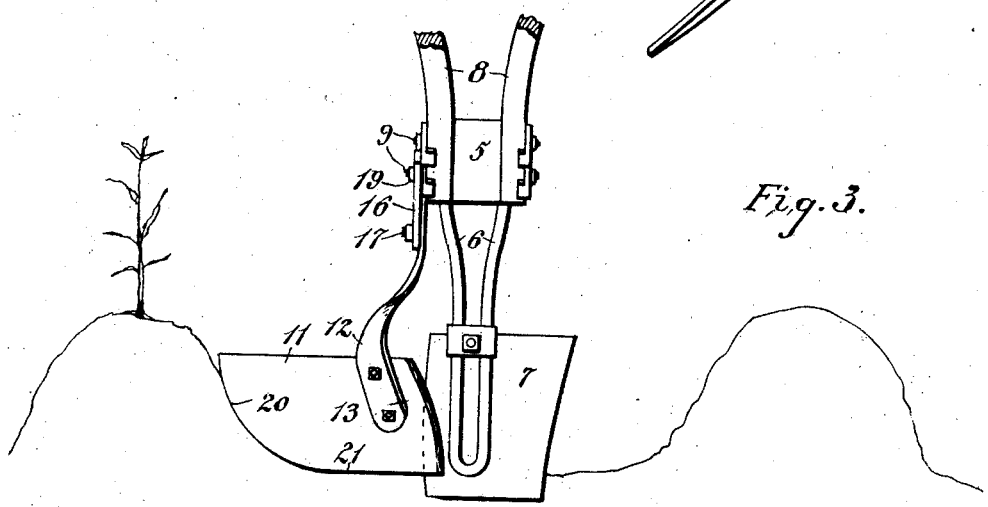

UNITED STATES PATENT OFFICE.

ANDREW THOMAS McILWAIN, OF ABBEVILLE, SOUTH CAROLINA.

SIDING ATTACHMENT FOR PLOWS.

No. 882,768.  Specification of Letters Patent.  Patented March 24, 1908.

Application filed November 1, 1907. Serial No. 400,189.

*To all whom it may concern:*

Be it known that I, ANDREW THOMAS McILWAIN, a citizen of the United States, residing at Abbeville, in the county of Abbeville and State of South Carolina, have invented certain new and useful Improvements in Siding Attachments for Plows, of which the following is a specification.

This invention is a siding-attachment for plows, and has for its object to provide an attachment of this kind which can be readily applied to any ordinary plow-stock and which is adjustable according to the nature of the work required, or the condition of the plants.

In the accompanying drawing, Figure 1 is a side elevation, Fig. 2 is a plan view showing the application of the invention, and Fig. 3 is a rear end view showing the plow in action.

Referring specifically to the drawing, 5 denotes the beam of the plow; 6 is the stock to which the shovel 7 is attached; and 8 are the handles which are fastened to the beam by bolts 9. The stock is fastened to the beam by bolts 10.

The attachment comprises a blade 11 having a shank 12 whereby it is attached to the plow. The shank is a curved bar to which the blade is fastened by bolts 13. The shank is secured to the stock 6 by one of the bolts 10 which fasten the latter to the beam 5. The shank has a slot 14 to receive the bolt 10, and outside the slot, the bolt is provided with a fastening nut 15. Additional fastening means for the shank comprises a short strap 16 bolted at one end thereto as indicated at 17, and having at the opposite end a slot 18 to receive one of the bolts 9 which fastens the handles 8 to the beam 5. On the outside of the slot 18 the bolt 9 is provided with a fastening nut 19.

The blade 11 is located behind the shovel 7 and extends obliquely thereto, the shank 12 being twisted to bring the blade into this position. The blade is bowed slightly, and its outer edge 20 extends in a curve toward its lower edge 21, and the latter is located above the lower edge of the shovel 7.

The attachment herein described is designed for use in connection with the operation known as "siding" or "barring" which consists in going up one side of the row and down the other, throwing the soil from young plants to the middle. This operation without the attachment leaves the edges of the row perpendicular in consequence of which the plants are more liable to be knocked over with the hoe, whereas with the attachment in position on the plow-stock the sharp edges of the rows are trimmed off or rounded as clearly shown in Fig. 3. This narrows the row and thus reduces the labor of hoeing and prevents the plants from falling over so easily. The attachment also permits a closer siding of young plants at the first plowing. The slot 14 permits the blade 11 to be adjusted forwardly and rearwardly, and its depth is regulated by the slot 18. The attachment therefore can be readily adjusted according to the nature of the work or the condition of the plants, and it can be attached to any ordinary plow-stock without the use of extra bolts.

I claim:—

1. An attachment for plows comprising a blade having a slotted shank, a slotted strap extending from the shank, and fastening bolts passing through said slots.

2. An attachment for plows comprising a blade carried thereby and set obliquely with respect to the plow shovel behind the same, the landside edge of said blade extending in a curve toward the lower edge thereof.

In testimony whereof I affix my signature, in presence of two witnesses.

ANDREW THOMAS McILWAIN.

Witnesses:
 C. J. LYON,
 HUGH BOWEN.